United States Patent
Saitoh et al.

(10) Patent No.: US 7,918,144 B2
(45) Date of Patent: Apr. 5, 2011

(54) SEATING SENSOR

(75) Inventors: Yukihiro Saitoh, Chiryu (JP); Hiroyuki Ito, Chita (JP); Yoshihiro Semaishi, Toyokawa (JP); Hitoshi Yuasa, Susono (JP); Hiroyuki Takahashi, Miyoshi (JP)

(73) Assignee: Denso Corporation, Kariya (JP)

( * ) Notice: Subject to any disclaimer, the term of this patent is extended or adjusted under 35 U.S.C. 154(b) by 72 days.

(21) Appl. No.: 12/290,446

(22) Filed: Oct. 30, 2008

(65) Prior Publication Data

US 2009/0107258 A1 Apr. 30, 2009

(30) Foreign Application Priority Data

Oct. 31, 2007 (JP) .................................. 2007-284115
Apr. 3, 2008 (JP) .................................. 2008-097128

(51) Int. Cl.
*G01D 7/00* (2006.01)
(52) U.S. Cl. .................................................. 73/862.046
(58) Field of Classification Search ........... 73/862.041–862.046
See application file for complete search history.

(56) References Cited

U.S. PATENT DOCUMENTS

| | | | | |
|---|---|---|---|---|
| 5,494,311 A | * | 2/1996 | Blackburn et al. | 280/735 |
| 5,570,903 A | * | 11/1996 | Meister et al. | 280/735 |
| 6,253,133 B1 | * | 6/2001 | Sakai et al. | 701/45 |
| 6,799,473 B2 | * | 10/2004 | Adrian | 73/856 |
| 7,162,344 B2 | | 1/2007 | Kojima et al. | |
| 7,629,546 B2 | * | 12/2009 | Saitoh et al. | 200/85 A |
| 2006/0150752 A1 | | 7/2006 | Lorenz et al. | |
| 2008/0122644 A1 | * | 5/2008 | Itoh et al. | 340/667 |
| 2008/0122645 A1 | * | 5/2008 | Saitoh et al. | 340/667 |

FOREIGN PATENT DOCUMENTS

| | | |
|---|---|---|
| EP | 1 591 321 | 11/2005 |
| JP | 61-113527 | 5/1986 |
| JP | 10-039045 | 2/1998 |
| JP | 2002-326547 | 11/2002 |
| JP | 2005-153556 | 6/2005 |
| JP | 2005-315745 | 11/2005 |

OTHER PUBLICATIONS

Office Action dated Dec. 8, 2009 in corresponding Japanese Application No. 2008-097128.
Examination Report in the corresponding CN application No. 200810173266.0 dated Jul. 30, 2010 with English translation.

* cited by examiner

*Primary Examiner* — Max Noori
(74) *Attorney, Agent, or Firm* — Harness, Dickey & Pierce, P.L.C.

(57) ABSTRACT

A seating sensor reliably senses an adult or a child seated on a vehicle seat, and prevents incorrect sensing of a seated occupant when a piece of luggage is placed on the seat. The seating sensor includes a first sensor cell, a second sensor cell connected in series with the first sensor cell and disposed on the front side of the seat beyond the first sensor cell, and a third sensor cell connected in series with the first sensor cell, connected in parallel with the second sensor cell, and disposed on the rear side of the seat beyond the first sensor cell.

15 Claims, 7 Drawing Sheets

VEHICLE FRONT SIDE

SEATING SENSOR

CROSS REFERENCE TO RELATED APPLICATIONS

The present application is based on and claims priority to Japanese Patent Applications 2007-284115 filed on Oct. 31, 2007 and 2008-097128 filed Apr. 3, 2008, the entire contents of which are incorporated herein by reference

BACKGROUND OF THE INVENTION

1. Field of the Invention

The present invention relates to a seating sensor for sensing that an occupant is seated on a vehicle seat, and more particularly, to a seating sensor including sensor cells that conduct due to a load applied by an occupant or occupants.

2. Description of the Related Art

A conventional seating sensor described in JP-A-10-39045 is disposed in a bearing surface part of a vehicle seat and includes multiple sensor cells that are connected in parallel with one another. In the seating sensor, when one sensor cell out of the multiple sensor cells conducts, a decision is made that an occupant is seated.

In view of the limitations of simple sensors, it is desirable to sense whether an occupant who is seated on a vehicle seat is an adult or a child, raising challenges. For example, compared with a range in a bearing surface part to which a load is applied when an adult is seated, a range in the bearing surface part to which a load is applied when a child is seated is narrow. In particular, the buttocks is the typical physical region of an occupant that applies a large load when the occupant is seated. A range in the bearing surface part to which the load is applied by the buttocks of a child when the child is seated may be located on the rear side of the bearing surface part or in the vicinity of the center of the bearing surface part. On the other hand, a range in the bearing surface part to which a load is applied by the buttocks of an adult when the adult is seated often extends from the center of the bearing surface part to the entire rear side of the bearing surface part. However, when an adult is seated on the front side of the bearing surface part, a range to which the load is applied may extend from the center of the bearing surface part to the entire front side thereof.

According to the seating sensor described in JP-A-10-39045, a seating state can be sensed including whether a seated occupant is an adult or a child, regardless any of the above described seating conditions. However, in the seating sensor of JP-A-10-39045, the number of sensor cells is numerous leading to increased cost. Moreover, due to the large number of sensors, any load can result in a detection event such that even when a piece of luggage is placed on the vehicle seat, any of the sensor cells may conduct leading to incorrect sensing of the seating of an occupant.

In order to solve the foregoing problem, a seating sensor, as described in JP-A-2005-153556, has been devised whereby the load bearing surface part of a vehicle seat is divided into two blocks on a vehicle front side and a vehicle rear side respectively. A sensor cell group is disposed in each of the blocks and includes multiple sensor cells that are separated from one another in a lateral direction of a vehicle. When the sensor cells included in the sensor cell group disposed at least on the front or rear side of the vehicle seat conduct simultaneously, seating of an occupant is decided. The sensor cells of the cell group are connected in series with each other and disposed on the vehicle front side of the bearing surface part, and two sensor cells that are connected in series with each other and disposed in the vehicle rear side of the bearing surface part. The cell group including the two sensor cells disposed on the vehicle front side of the bearing surface part and the cell group including the two sensor cells disposed on the vehicle rear side thereof are connected in parallel with each other. According to the seating sensor, unless at least the two sensor cells disposed on the front side or rear side conduct simultaneously, a decision is not made that an occupant is seated. Moreover, JP-A-2005-153556 describes an arrangement whereby it can be sensed whether the occupant that is seated is an adult or a child.

However, although the seating sensor described in JP-A-10-39045 has the merit of being able to sense seating of an occupant substantially all over the bearing surface part, numerous sensor cells are needed to cover the bearing surface part of the vehicle seat. From the viewpoint of a reduction in a cost, there is room for modification of the disposed positions of the sensor cells. Moreover, the seating sensor described in JP-A-2005-153556 has the merit that once the disposed positions of the sensor cells are modified, a cost can be reduced and incorrect detection of seating caused by an article such as a handbag can be diminished. However, in the above noted documents, no consideration is taken in a case where a piece of luggage is applied, where a load is applied to the vehicle right or left side of the bearing surface part due to, for example, an occupant leaning toward the right or left side of the bearing surface part, or where a load associated with a seated child is applied offering a more narrow range for sensing.

It should be noted that a piece of luggage such as, for example, a handbag when placed on a vehicle seat has a very small mass compared with an occupant. Consequently, as long as the luggage is placed on the bearing surface part of the vehicle seat so that the weight of the luggage is uniformly distributed over the bearing surface part, the possibility that any of the sensor cells will conduct is low. However, for example, if the luggage is placed on the bearing surface part against the backrest part, since the luggage enters a one-side borne state, a large load may be applied to a partial range on the bearing surface part. For example, a large load may be applied to the vehicle rear side part of the bearing surface part. In such a case, in the seating sensor described in JP-A-2005-153556, the two sensor cells disposed in the vehicle rear side conduct simultaneously creating the possibility that incorrect sensing may be caused by the luggage.

SUMMARY OF THE INVENTION

The present invention is provided in view of the foregoing, and provides a seating sensor that accurately senses a load pressure area formed on a bearing surface part of a vehicle seat along with seating of an occupant, reduces the possibility of incorrect sensing, and reduces an overall cost of the seat and sensor. The seating sensor is capable of reliably sensing of the seating of an adult or a child and prevents the incorrect sensing of the seating of an occupant when luggage is placed on the seat.

A seating sensor in accordance with various embodiments is disposed in a bearing surface part of a vehicle seat, and includes sensor cells that, when incurring a load, conduct with two opposed electrodes abutted against each other.

The seating sensor includes a first sensor cell, a second sensor cell connected in series with the first sensor cell and disposed on a portion of the seat, that is, a portion of the bearing surface of the seat, toward the front of the vehicle beyond the first sensor cell, and a third sensor cell connected in series with the first sensor cell, connected in parallel with the second sensor cell, and disposed on a portion of the seat toward the rear of the vehicle beyond the first sensor cell.

Namely, as long as the first and second sensor cells conduct or the first and third sensor cells conduct, the seating sensor in accordance with an embodiment senses the seating of an occupant.

When an adult is seated on a vehicle seat, the buttocks of the adult occupy a relatively wide range from the center part of the vehicle seat to the portion of the seat toward the vehicle rear. In such a case, all the first, second, and third sensor cells conduct. However, when an adult is seated on the portion of the vehicle seat toward the vehicle front, a load caused by the buttocks of the adult is not applied to the portion of the seat toward the vehicle rear. Although no load is applied to the third sensor cell, at least the first and second sensor cells conduct. Moreover, since the buttocks of a child are smaller than those of the adult, when the child is seated on the portion of the seat toward the vehicle rear, for example, the first and third sensor cells conduct. When the child is seated on the portion of the vehicle seat toward the vehicle front, for example, the first and second sensor cells conduct. Thus, it can be reliably sensed whether an occupant is an adult or a child and whether the seating position is on the portion of the seat toward the vehicle front or the vehicle rear.

When a large load, such as that associated with one side of a piece of luggage, is placed on of the bearing surface part of the seat, the large load is often applied along a range of the bearing surface part such as, for example, a linear range parallel to the backrest part. According to an exemplary seating sensor, the first, second, and third sensor cells are displaced from one another along the front to back direction of a vehicle. Consequently, even when a large load is applied to the linear range parallel to the backrest part by the luggage, the state in which the first and second sensor cells or the first and third sensor cells conduct simultaneously will not be established. Thus, even when one-side of the luggage is placed on the bearing portion of the seat, incorrect sensing caused by the luggage can be prevented.

For the seating sensor in accordance with an embodiment, the second and third sensor cells are advantageously displaced from the first sensor cell to the right and left sides respectively of the vehicle. Namely, the first, second, and third sensor cells are displaced from each other in the back-and-forth direction of the vehicle and in the right-and-left direction.

In one aspect, the second sensor cell is displaced from the first sensor cell to one of the right and left sides of the vehicle, and the third sensor cell is displaced from the first sensor cell to the other one of the right and left sides of the vehicle. In the second mode, the second and third sensor cells are displaced from the first sensor cell to one of the right and left sides of the vehicle.

In another aspect, the first, second, and third sensor cells are displaced from one another in the back-and-forth direction and in the right-and-left direction of the vehicle. Further, the second and third sensor cells are disposed in a direction opposite to the first sensor cell in the back-and-forth direction of the vehicle and are also disposed in a direction opposite to the first sensor cell in the right-and-left direction. For example, the first, second, and third sensor cells are disposed from the right front side of the vehicle to the left rear side of the vehicle in an order from the second, to the first, and to the third.

A situation is conceivable where a large load such as one side of a piece of luggage is applied to a linear range parallel to the backrest part as noted above. Another situation is also conceivable where a large load is applied along a linear range perpendicular to the backrest part. Even in such a case, since the first, second, and third sensor cells are displaced from one another in the right-and-left direction of the vehicle, incorrect sensing caused by the luggage can be prevented.

In accordance with another aspect, the second and third sensor cells are displaced from the first sensor cell toward the same side of the vehicle such as toward the right side or toward the left side.

Even in such a case, even if a large load such as one side of a piece of luggage is applied to the linear range perpendicular to the backrest part, since the first, second, and third sensor cells are displaced from one another in the right-and-left direction of the vehicle, incorrect sensing caused by the luggage can be prevented.

In accordance with another aspect, a seating sensor includes a fourth sensor cell connected in series with the first sensor cell, connected in parallel with the second and third sensor cells. The fourth sensor cell is disposed on the front side of a vehicle beyond the first sensor cell, and displaced from the first sensor cell to the other one of the right and left sides of the vehicle. The seating sensor includes a fifth sensor cell connected in series with the first sensor cell, connected in parallel with the second, third, and fourth sensor cells, disposed on the rear side of the vehicle beyond the first sensor cell, and displaced from the first sensor cell to one of the right and left sides of the vehicle.

Consequently, even when an occupant is seated on the bearing surface but leaning in the right-and-left direction of the vehicle on a portion of the seat, the seating can be reliably sensed. For example, when the occupant sits down to lean to the left side of the vehicle and to the front side thereof, the first and second sensor cells conduct. When the occupant sits down to lean to the right side of the vehicle and to the front side thereof, the first and fourth sensor cells conduct. When the occupant sits down to lean to the left side of the vehicle and to the rear side thereof, the first and fifth sensor cells conduct. When the occupant sits down to lean to the right side of the vehicle and to the rear side thereof, the first and third sensor cells conduct. The seating sensor can be disposed in a bearing surface part of a vehicle seat and can have a center rightward or leftward with respect to a vehicle center in the right-and-left direction of the vehicle. The sensor can include one sensor cell or multiple sensor cells that, when incurring a load, conduct with a pair of opposed electrodes abutting each other. The center of a load sensing area formed by the one sensor cell or multiple sensor cells in the right-and-left direction of the vehicle is located on the vehicle center side of the bearing surface part away from the bearing surface part center.

It should be noted that as used herein, the phrase "bearing surface part center" can refer to the structural center of a seating part of a vehicle seat, and the "vehicle center" means the structural center of a vehicle body in which the vehicle seat including a backrest part and a headrest part is mounted. Consequently, in a typical vehicle, seats including front seats and rear seats are mounted in the vehicle body and disposed back and forth and generally face, for example, in a vehicle advancing direction. The seats are disposed on right and left sides with respect to the vehicle center. In other words, the bearing surface part center of the vehicle seat is located rightward or leftward with respect to the vehicle center of the vehicle body in which the vehicle seat is mounted. The structural location of the bearing surface part center is uniquely determined in relation to the seating part of the vehicle seat. The relative center of a load distribution formed by an occupant who is seated on the vehicle seat, that is, a seating center does not coincide with the physical bearing surface part center. A typical load pressure distribution expressing degrees of a load pressure applied in a seated state has two peaks positioned in the right-and-left direction of the vehicle. The load pressure distribution peaks correspond to areas of maximum load associated with the seated location of the buttocks of the occupant, and exhibit a moderate decrease in the load pressure toward the front of the vehicle in line with the shapes of the right and left thighs. The load pressure distribution reflects the body shape of the occupant in the current seating posture and is substantially laterally symmetrical reflecting the general shape of the buttocks and thighs. The center of the load pressure distribution corresponds to the seating center, and is formed to the side relative to the vehicle center and away from the physical bearing surface part center.

A load sensing area can be formed by one sensor cell or multiple sensor cells included in a seating sensor. When the center of a load sensing area incurs a load, the one sensor cell or multiple sensor cells conduct with a pair of opposed electrodes abutted against each other in the right-and-left direction of the vehicle. The center of the load sensing area is located on a side of the vehicle center away from the bearing surface part center such that the seating of an occupant can be reliably detected. The disposition of the seating sensor reflects the body shape of the occupant or the seating posture thereof. Therefore, the seating sensor capable of reliably sensing a load pressure area formed on the bearing surface part of a vehicle seat even when, for example, the occupant sits to lean on the right or left side of the vehicle can be provided.

In another aspect, one sensor cell or the majority of multiple sensor cells may be disposed in an area by the side of the vehicle center away from the bearing surface part center. The dispositional relationship is applied to a load sensing area formed by one sensor cell or the whole of multiple sensor cells, whereby a seating sensor that can cope with various seating postures of occupants and has a wider sensible range can be realized.

A first film and a second film that has the same shape as the first film does and is opposed to the first film are included in a seating sensor. Multiple sensor cells are opposed to and separated from one another between the first and second films and are separated from one another in a horizontal direction. Moreover, a conducting member that is interposed between the first and second films, conducts to the sensor cells, and has the proximal end thereof connected to a control unit.

In the foregoing construction, the control unit extends control on the basis of a surface pressure that is a load pressure detected by the sensor cells. For example, a seat belt warning or the like can be given irrespective of the seating posture of an occupant. Due to the film shape, the cost of the seating sensor can be largely reduced. Specifically, since the first film and second film can be obtained from one large film substance, a production volume per amount of the film substance can be increased. Since the unnecessary region of the film substance to be obtained can be drastically diminished, the yield percentage for the film increases and manufacturing efficiency can be improved.

The conducting member may extend linearly in the bearing surface part in a direction crossing both the back-and-forth direction of the vehicle and the right-and-left direction thereof. A seating sensor can thereby be realized in a simple form The conducting member may include a trunk conducting member whose proximal end conducts to the control unit, which extends in the back-and-forth direction of the vehicle, and right-and-left conducting members that are connected to the trunk conducting member and extend in the right-and-left direction of the vehicle. Such a construction is effective for sensing an occupant seating area, that is, a load pressure area that extends in the right-and-left direction of the vehicle on the bearing surface part.

The conducting member may alternatively include a trunk conducting member whose proximal end conducts to the control unit, which extends in the back-and-forth direction of the vehicle, and multiple branch-like conducting members that branch out from the distal end of the trunk conducting member and extends in the back-and-forth direction of the vehicle. The construction proves effective in sensing seating of a child who exhibits a wide action range in the back-and-forth direction of the vehicle and in the right-and-left direction thereof and who forms a narrow load pressure area when sitting down.

The number of sensor cells may be equal to or smaller than ten. The construction contributes to a reduction in a cost of a seating sensor because the number of required sensor cells can be suppressed.

One sensor cell or multiple sensor cells may be disposed in an area on the rear side of the bearing surface part away from the center thereof in the back-and-forth direction of the vehicle. Based on the above construction, when an occupant sits down to lean against the backrest part of the vehicle seat, a load pressure area formed on the vehicle rear side of the bearing surface part by the buttocks can be reliably sensed.

The bearing surface part may also include multiple bearing surface parts, center parts of which are located rightward or leftward with respect to the vehicle center in the right-and-left direction of the vehicle. The multiple bearing surface parts are included in a vehicle seat that is elongated in the right-and-left direction of the vehicle and is for seating of multiple occupants. In view of the above described construction, a seating sensor can be realized having a load pressure area formed such that a load applied when an occupant is seated on the vehicle seat on which multiple occupants can be seated side by side can be detected.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

First Embodiment

Figure 1:
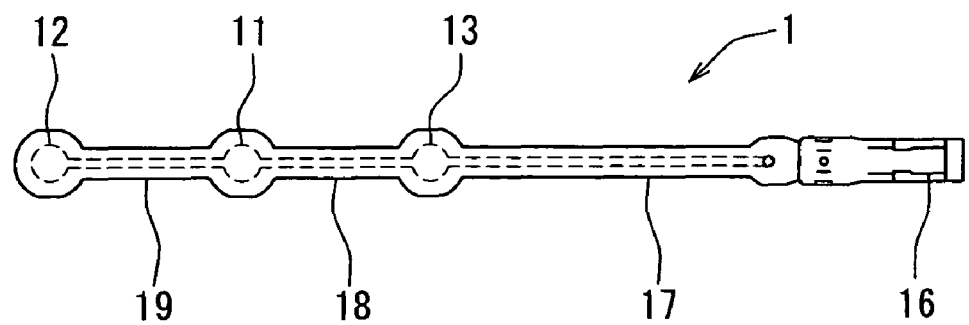
FIG. 1 is a diagram illustrating a plan view of an exemplary seating sensor.
Figure 2:
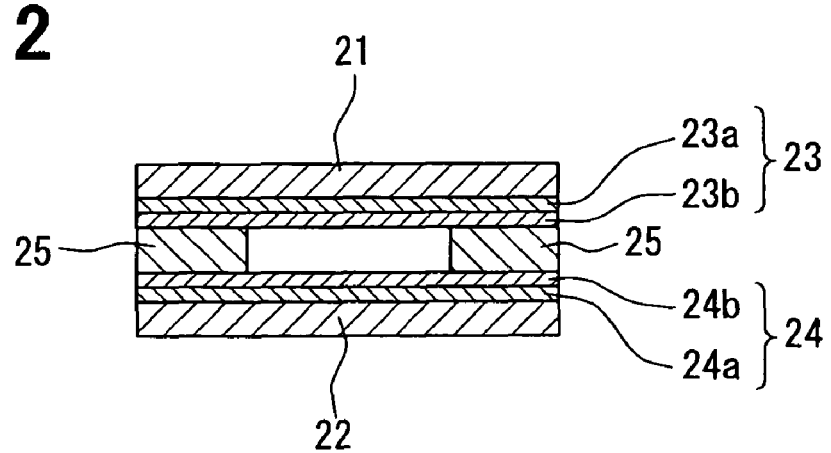
FIG. 2 is a diagram illustrating a sectional enlarged view of a region of an exemplary sensor cell of the seating sensor.

Various exemplary embodiments will now be introduced. Referring to FIG. 1 to FIG. 4, a seating sensor 1 of a first embodiment will be described below. FIG. 1 is a plan view of the seating sensor 1. FIG. 2 is a sectional enlarged view of a region of a sensor cell 11 of the seating sensor 1. FIG. 3 are plan views of a state in which the seating sensor 1 is mounted in a vehicle seat 2, that is, views of the seating sensor 1 seen from above a vehicle. FIG. 4 is a circuit diagram of the seating sensor 1.

As shown in FIG. 1, the seating sensor 1 includes three sensor cells 11, 12, and 13, a connector 16, and conducting members 17, 18, and 19 that link the respective sensor cells 11 to 13 and the connector 16. The sensor cells 11 to 13 function as switches that conduct when incurring a load due to an occupant or a piece of luggage. The connector 16 includes two terminals connected to the sensor cells 11 to 13 over the conducting members 17 to 19, and is connected to an occupant sensing electronic control unit (ECU) mounted in a vehicle. Moreover, the first conducting member 17 is formed to linearly extend from the connector 16 to the third sensor cell 13. The second conducting member 18 has the same linear shape as the first conducting member 17 does, and is formed to linearly extend from the third sensor cell 13 to the first sensor cell 11. The third conducting member 19 has the same linear shape as the first and second conducting members 17 and 18 do, and is formed to linearly extend from the first sensor cell 11 to the second sensor cell 12. Namely, the second sensor cell 12, first sensor cell 11, and third sensor cell 13 are linearly disposed in that order from the connector 16 side.

The sectional construction of the seating sensor 1 will be described with reference to FIG. 2. As shown in FIG. 2, the seating sensor 1 includes a first film 21, a second film 22, a first electrode 23, a second electrode 24, and a spacer 25. However, the regions of the sensor cells 11 to 13 of the seating sensor 1 and the regions of the conducting members 17 to 19 thereof share the fundamental construction but are slightly different from each other in construction. A description will be made by clarifying the difference between the regions of the sensor cells 11 to 13 and the regions of the conducting members 17 to 19.

The first film 21 contours the sensor cells 11 to 13 and the conducting members 17 to 19. The first film 21 is made of a polyethylene naphthalate (PEN) plastic resin and formed thinly. The first film 21 included in the regions of the sensor cells 11 to 13 is shaped nearly circularly, the first film 21 included in the regions of the conducting members 17 to 19 is shaped linearly to have a width smaller than the diameter of the circular shape. The connector 16 is coupled to the proximal end of the first film 21. The second film 22 is made of the same material as the first film 21 is and has the same shape as the first film 21 does. The second film 22 is opposed to the first film 21. The proximal end of the second film 22 is coupled to the connector 16 in the same manner as that of the first film 21.

The first electrode 23 is formed on one side of the first film 21. Specifically, the first electrode 23 is disposed in the space between the first film 21 and second film 22. The first electrode 23 includes a silver layer 23a bonded to the one side of the first film 21, and a carbon layer 23b shielding the surface of the silver layer 23a. The first electrode 23 in the regions of the sensor cells 11 to 13 is formed at least in the center of the circular first film 21. Moreover, the first electrode 23 in the regions of the conducting members 17 to 19 is appropriately wired according to a circuit to be constructed.

The second electrode 24 is formed on a side of the second film 22 opposed to the first electrode 23. Specifically, the second electrode 24 is disposed in the lower part in FIG. 2 of the interspace between the first and second films 21 and 22. The second electrode 24 includes a silver layer 24a bonded to the one side of the second film 22 and a carbon layer 24b shielding the surface of the silver layer 24a. The carbon layer 24b of the second electrode 24 is disposed away from the first electrode 23. The second electrode 24 in the regions of the sensor cells 11 to 13 is formed at least in the center of the circular second film 22. The first and second electrodes 23 and 24 are opposed to each other in the regions of the sensor cells 11 to 13. The second electrode 24 in the regions of the conducting members 17 to 19 is appropriately wired according to a circuit to be constructed.

The outline of the spacer 25 is the same as those of the first and second films 21 and 22. However, the center part of the spacer 25 in the width direction is formed to penetrate through the seating sensor as indicated with a dashed line in FIG. 1. Specifically, the penetrative width of the spacer 25 in the regions of the sensor cells 11 to 13 is wider than the penetrative width in the regions of the conducting members 17 to 19. The spacer 25 is made from a thinly formed PEN plastic resin.

The spacer 25 is interposed between the first and second electrodes 23 and 24. In FIG. 2, a space is formed among the first electrode 23, second electrode 24, and spacer 25. As mentioned above, the penetrative width of the spacer 25 included in the regions of the sensor cells 11 to 13 is wider than the penetrative width thereof included in the regions of the conducting members 17 to 19. Therefore, the width of the space in the sensor cells 11 to 13, that is, the width in the right-and-left direction in FIG. 2 is wider than the width thereof in the conducting members 17 to 19. Consequently, in the regions of the sensor cells 11 to 13 in which the space is wide, when a compressive load that works in the up-and-down direction of FIG. 2 is applied, the first film 21, second film 22, first electrode 23, and second electrode 24 are distorted and deformed. The first and second electrodes 23 and 24 therefore abut against each other and conduct. In other words, in the regions of the sensor cells 11 to 13, when the compressive load is applied, the first and second electrodes 23 and 24 conduct, that is, function as a so-called switch. Incidentally, the space in the conducting members 17 to 19 functions as an air fleeing passage. Namely, the space in the conducting members 17 to 19 is intended to allow internal air to flee away when the space in the sensor cells 11 to 13 is compressed.

Next, a state in which the seating sensor 1 is mounted in the vehicle seat 2 will be described. In FIG. 3A to FIG. 3D, a hatched area indicates a range of a load that the bearing surface part 2a incurs when an occupant is seated on the vehicle seat 2. In particular, a deeply hatched part of the hatched area in any of FIG. 3A to FIG. 3D indicates a range that corresponds to the buttocks of an occupant and that corresponds to locations where the bearing surface part 2a incurs a larger load as compared to the range indicated with a lightly hatched part corresponding, for example, to the thighs of the occupant.

Figure 3A:
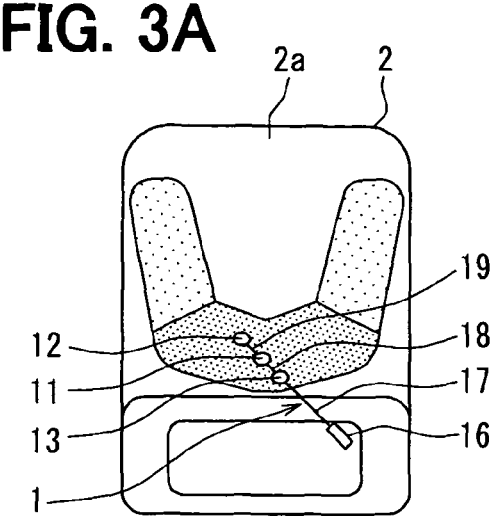
FIG. 3A is a diagram illustrating a plan view of one state in which the seating sensor is mounted in a vehicle seat.
Figure 4:
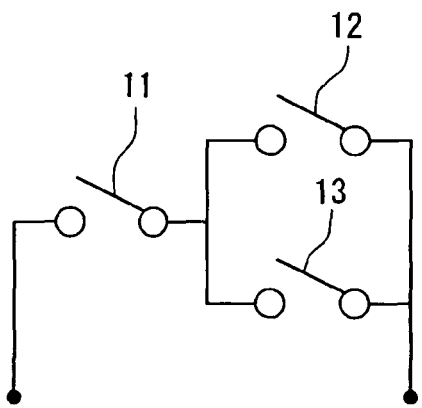
FIG. 4 is a circuit diagram illustrating an exemplary seating sensor.

As shown in FIG. 3A, the seating sensor 1 is mounted in the bearing surface part 2a of the vehicle seat 2. More particularly, the seating sensor 1 is interposed between a cushion of the bearing surface part 2a and a facing thereof. Specifically, the sensor cells 11 to 13 of the seating sensor 1 are disposed on the rear side of the vehicle beyond the center of the bearing surface part 2a in the back-and-forth direction of the vehicle and disposed in the center thereof in the right-and-left direction of the vehicle. The connector 16 is located on the rear side of the vehicle beyond the sensor cells 11 to 13.

The hatched area in FIG. 3A illustrates a case where an adult is seated on the bearing surface part 2a in a correct posture, that is, the buttocks of an adult are located on the vehicle rear side of the bearing surface part 2a. In such a case, the buttocks of the adult who is seated are located on the sensor cells 11 to 13 of the seating sensor 1. Therefore, when the adult is seated on the vehicle seat 2 in a correct posture, the sensor cells 11 to 13 all conduct. As used herein, the term adult can refer to an average size or relatively smaller than average grown-up. In a case of a relatively larger than average grown-up, a load would be applied to a range wider than the range illustrated in the figures.

Figure 3B:
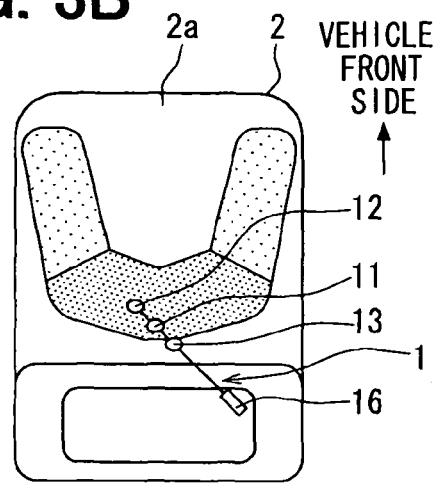
FIG. 3B is a diagram illustrating a plan view of another state in which the seating sensor is mounted in a vehicle seat.

The hatched area in FIG. 3B illustrates a case where an adult is seated on the vehicle front side of the bearing surface part 2a. In such a case, the buttocks of the adult are located on the first and second sensor cells 11 and 12 of the seating sensor 1 such that the first and second sensor cells 11 and 12 conduct.

Figure 3C:
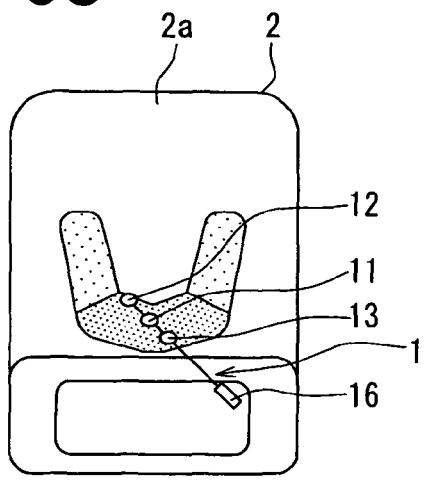
FIG. 3C is a diagram illustrating a plan view of another state in which the seating sensor is mounted in a vehicle seat.

The hatched area in FIG. 3C illustrates a case where a child is seated on the bearing surface part 2a in a posture whereby the buttocks are located on the vehicle rear side of the bearing surface part 2a. In such a case, the buttocks are located on the first and third sensor cells 11 and 13 of the seating sensor 1. The first and third sensor cells 11 and 13 conduct. As used herein, the term child can refer to a child having an average size, such as, for example, having a size that falls within a statistically normal distribution of size for children of approximately six years of age.

Figure 3D:
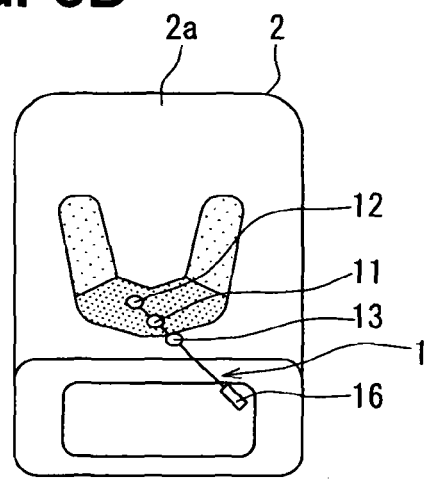
FIG. 3D is a diagram illustrating a plan view of still another state in which the seating sensor is mounted in a vehicle seat.

The hatched area in FIG. 3D illustrates a case where a child is seated on the vehicle front side of the bearing surface part 2a. In such a case, the buttocks of the child are located on the first and second sensor cells 11 and 12 of the seating sensor 1. The first and second sensor cells 11 and 12 conduct.

Next, the circuitry of the seating sensor 1 will be described. As shown in FIG. 4, the first and second sensor cells 11 and 12, and the first and third sensor cells 11 and 13 are connected in series with each other. The second and third sensor cells 12 and 13 are connected in parallel with each other.

Consequently, if the first and second sensor cells 11 and 12 conduct, the entire circuit conducts. If the first and third sensor cells 11 and 13 conduct, the entire circuit conducts. Naturally, if the first, second, and third sensor cells 11, 12, and 13 conduct, the entire circuit conducts.

Next, an operation exerted by the foregoing seating sensor 1 will be described. When, as shown in FIG. 3A, an adult occupant is seated on the vehicle seat 2 in a posture whereby the buttocks of the occupant press all the sensor cells 11 to 13 of the seating sensor 1, all the sensor cells 11 to 13 conduct, and the terminals of the connector 16 conduct. In other words, the occupant sensing ECU connected to the connector 16 senses that the terminals of the connector have conducted, and decides that an occupant is seated on the vehicle seat 2.

When an adult is not seated in the above described posture, or more particularly, when an adult sits down on the vehicle front side of the vehicle seat 2 in the manner illustrated in FIG. 3A, at least the first and second sensor cells 11 and 12 conduct. The first and second sensor cells 11 and 12 are connected in series with each other, and the terminals thereof are connected to the terminals of the connector 16. Consequently, even in such a case, a decision is reliably made that an occupant is seated on the vehicle seat 2.

When a child sits in a posture whereby the buttocks of the child press the first and third sensor cells 11 and 13, the sensor cells conduct. The first and third sensor cells 11 and 13 are connected in series with each other, and the terminals thereof are connected to the terminals of the connector 16. Consequently, in such a case, a decision is reliably made that an occupant is seated on the vehicle seat 2.

When a child is seated on the vehicle front side of the vehicle seat, the result is the same as that of the above described case when an adult is seated on the vehicle front side of the vehicle seat. Consequently, even when the occupant is a child seated on a vehicle front side of the vehicle seat, a decision is reliably made that an occupant is seated on the vehicle seat 2.

For example, although an occupant is seated on the vehicle seat 2, if the occupant does not wear a seatbelt, the occupant sensing ECU activates a warning lamp, such as by lighting or flashing. Information sensed by the occupant sensing ECU is transmitted to an air bag ECU that controls start of an occupant protection system including an air bag. When a decision is made that an occupant is seated on the vehicle seat 2, the air bag ECU is configured to start the occupant protection system in a case when the vehicle collides against an external object.

A case where a piece of luggage is placed on, the vehicle seat 2 will be discussed. It should be noted that a state in which the terminals of the connector 16 of the seating sensor 1 conduct can refer to a state in which the first and second sensor cells 11 and 12 conduct or can refer to a state in which the first and third sensor cells 11 and 13 conduct.

A case where a piece of luggage such as, for example, a handbag is placed on the sensor cells 11 to 13 in the bearing surface part 2a of the vehicle seat 2 will be considered. In a case where the luggage is placed so that a uniform force will be applied to the bearing surface part 2a, if the luggage is lighter in weight than an occupant, the sensor cells 11 to 13 do not conduct. Consequently, the terminals of the connector 16 will not conduct. Namely, the occupant sensing ECU decides that no occupant is seated on the vehicle seat 2.

For example, when a piece of luggage is placed on the bearing surface part 2a against the backrest part, a large load may be applied to a specific narrow range on the bearing surface part 2a according to the shape or size of the luggage. In such a case, any of the sensor cells 11 to 13 may conduct. However, even if any of the sensor cells 11 to 13 were to conduct due to the luggage, unless any of the sensor cells 11 to 13 connected in series with the conducting sensor cell conducts, the terminals of the connector 16 do not conduct. In such a case, the occupant sensing ECU decides that no occupant is seated on the vehicle seat 2.

Moreover, when a piece of luggage is placed on the bearing surface part 2a against the backrest part, a large load may be applied to a linear range parallel to or perpendicular to the backrest part. In such cases, a large load is applied to a linear range on the bearing surface part 2a in the right-and-left direction of the vehicle or the back-and-forth direction thereof. Since the sensor cells 11 to 13 of the seating sensor 1 of the present embodiment are displaced from one another in the back-and-forth direction of the vehicle and in the right-and-left direction, when a large load is applied along one of the linear ranges either parallel to or perpendicular to the backrest part, it is likely that at least one of the sensor cells 11 to 13 may conduct, while it is unlikely that another of the sensor cells 11 to 13 connected in series with conducting sensor cells will conduct. In such a case, the occupant sensing ECU decides that no occupant is seated on the vehicle seat 2.

The sensor cells connected in series with each other are oriented in a direction oblique to the back-and-forth direction of the vehicle. Consequently, the likelihood that a large load associated with a piece of luggage and applied in the oblique sensing direction is low and incorrect sensing caused by luggage can be reliably prevented.

In the foregoing embodiment, the sensor cells 11 to 13 of the seating sensor 1 are displaced from one another in the back-and-forth direction of the vehicle and in the right-and-left direction. When a piece of luggage is propped against the backrest part and placed on the bearing surface part 2a such that the luggage is in a state of resting on one side thereof, it is likely that a large load may be applied to the linear range parallel to the backrest part. In the above described condition, the likelihood that a large load may be applied to the linear range perpendicular to the backrest part is relatively low compared to the possibility that the large load is applied to the linear range parallel to the backrest part. It should be noted that in the above example, the sensor cells 11 to 13 of the seating sensor 1 are not displaced from one another in the right-and-left direction of the vehicle, that is, are arranged linearly in the back-and-forth direction thereof. However, when displaced from one another in the right-and-left direction of the vehicle the sensor cells can be said to be more likely to sense a large load applied along the linear range that is perpendicular to the backrest part.

Second Embodiment

Figure 5:
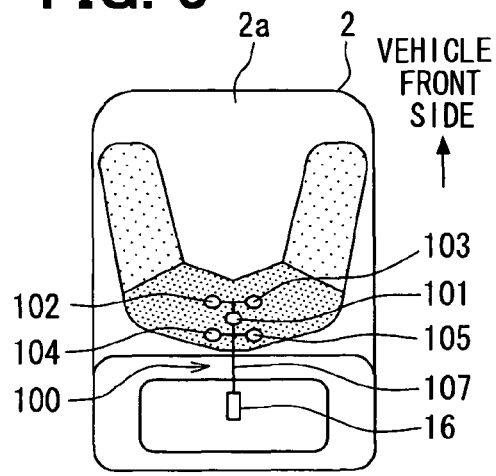
FIG. 5 is a diagram illustrating a plan view of a state in which a seating sensor is mounted in the vehicle seat.
Figure 6:
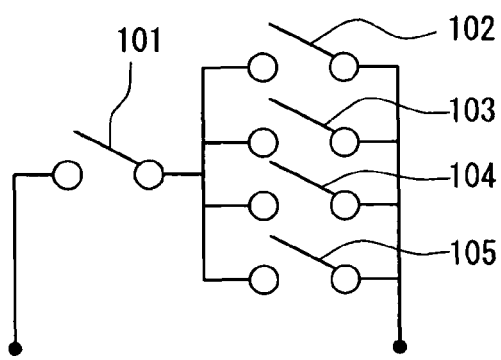
FIG. 6 is a circuit diagram illustrating an alternative configuration of an exemplary seating sensor.

Next, a seating sensor 100 of a second embodiment will be described with reference to FIG. 5 and FIG. 6. FIG. 5 is a plan view of a state in which the seating sensor 100 is mounted in the vehicle seat 2. FIG. 6 is a circuit diagram of the seating sensor 100. The same reference numerals will be assigned to components identical to those of a first embodiment, and a description will be omitted.

As shown in FIG. 5, the seating sensor 100 includes five sensor cells 101, 102, 103, 104, and 105, a connector 16, and a conducting member 107. The sectional construction of the seating sensor 100 is identical to that of the seating sensor 1 of a first embodiment.

The second sensor cell 102 is located at a position toward the front side and to the left side of the vehicle from the position of the first sensor cell 101. The third sensor cell 103 is located at a position toward the front side and to the right side of the vehicle from the position of the first sensor cell 101. The fourth sensor cell 104 is located at a position toward the rear side and to the left side of the vehicle from the position of the first sensor cell 101 on the same side of the vehicle in the right-and-left direction as the position of the second sensor cell 102. The fifth sensor cell 105 is located at a position toward the rear side and to the right side of the vehicle from the position of the first sensor cell 101 on the same side of the vehicle in the right-and-left direction as the position of the third sensor cell 103 and on the same side of the vehicle in the back-and-forth direction as the fourth sensor cell 104. The buttocks of an adult sitting in a given posture are located at a position at which all of the sensor cells 101 to 105 are pressed. The conducting member 107 interconnects the sensor cells 101 to 105 and links the sensor cells 101 to 105 and the connector 16.

Among the sensor cells 101 to 105, the first sensor cell 101 is, as shown in FIG. 6, connected in series with the second, third, fourth, and fifth sensor cells 102 to 105. Moreover, the second, third, fourth, and fifth sensor cells 102 to 105 are connected in parallel with one another. Namely, if the first sensor cell 101 conducts and any of the second to fifth sensor cells 102 to 105 conducts, the terminals of the connector 16 conduct.

In such a case, advantages as found in connection with the seating sensor 1 of a first embodiment can be provided. Further, even when an occupant is seated on the bearing surface part 2a and leans one way or another along the right-and-left direction of the vehicle, the seating of the occupant can be reliably sensed. For example, when the occupant is seated on the vehicle front side of the bearing surface part 2a and on the vehicle left side thereof, the first and second sensor cells 101 and 102 conduct. According to the seating sensor 100 of a second embodiment, seating can be reliably sensed when the occupant leans in the back-and-forth direction of the vehicle and also when the occupant leans in the right-and-left direction of the vehicle. Whether the occupant is an adult or a child, the seating can be sensed.

Third Embodiment

Figure 7:
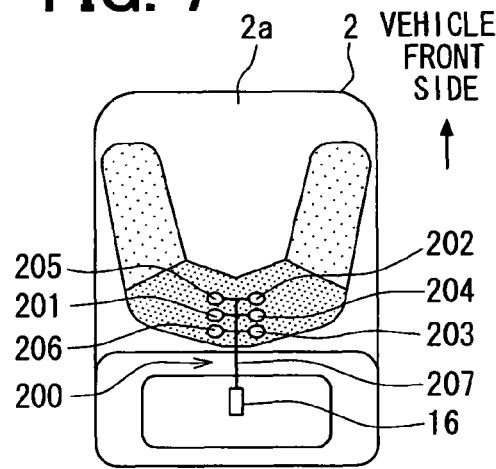
FIG. 7 is a diagram illustrating a plan view of a state in which a seating sensor is mounted in a vehicle seat.
Figure 8:
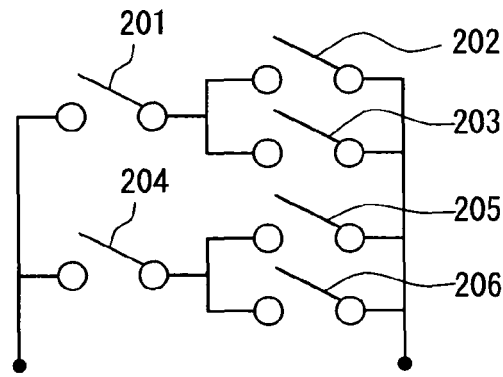
FIG. 8 is a circuit diagram illustrating an another alternative configuration of an exemplary seating sensor.

Next, a seating sensor 200 of a third embodiment will be described with reference to FIG. 7 and FIG. 8. FIG. 7 is a plan view of a state in which the seating sensor 200 is mounted in the vehicle seat 2. FIG. 8 is a circuit diagram of the seating sensor 200. The same reference numerals will be assigned to components identical to those of a first embodiment, and a description will be omitted.

As shown in FIG. 7, the seating sensor 200 includes six sensor cells 201, 202, 203, 204, 205, and 206, a connector 16, and a conducting member 207. The sectional construction of the seating sensor 200 is identical to that of the seating sensor 1 of a first embodiment.

The second sensor cell 202 is located at a position toward the front side and to the right side of the vehicle from the position of the first sensor cell 201 or a generally central position of the group of sensor cells. The third sensor cell 203 is located at a position toward the rear side and to the right side of the vehicle from the position of the first sensor cell 201. The fourth sensor cell 204 is located at a position toward the right side of the vehicle from the position of the first sensor cell 201 between and on the same side as the second and third sensor cells 202 and 203 in the right-and-left direction of the vehicle. The fifth sensor cell 205 is located at a position toward the front side and to the left side of the vehicle from the position of the fourth sensor cell 204 or from a generally central position of the group of sensor cells and on the same side as the first sensor cell 201 in the right-and-left direction of the vehicle, and on the same side of the vehicle as the second sensor cell 202 in the back-and-forth direction. The sixth sensor cell 206 is located at a position toward the rear side and to the left side of the vehicle from the fourth sensor cell 204 and on the same side as the first sensor cell 201 in the right-and-left direction of the vehicle, and on the same side as the third sensor cell 203 in the back-and-forth direction. When an adult sits in a given posture such that the buttocks press all the sensor cells 201 to 206, the conducting member 207 interconnects the sensor cells 201 to 206 and links the sensor cells 201 to 206 and the connector 16.

Among the sensor cells 201 to 206, the first sensor cell 201 is, as shown in FIG. 8, connected in series with the second and third sensor cells 202 and 203. The second and third sensor cells 202 and 203 are connected in parallel with each other. If the first sensor cell 201 conducts and either of the second and third sensor cells 202 and 203 conducts, the terminals of the connector 16 conduct. Moreover, the fourth sensor cell 204 is connected in series with the fifth and sixth sensor cells 205 and 206. The fifth and sixth sensor cells 205 and 206 are connected in parallel with each other. If the fourth sensor cell 204 conducts and either of the fifth and sixth sensor cells 205 and 206 conducts, the terminals of the connector 16 conduct. In such a case, an advantage associated with the seating sensor 1 of a first embodiment is provided.

Fourth Embodiment

Figure 9:
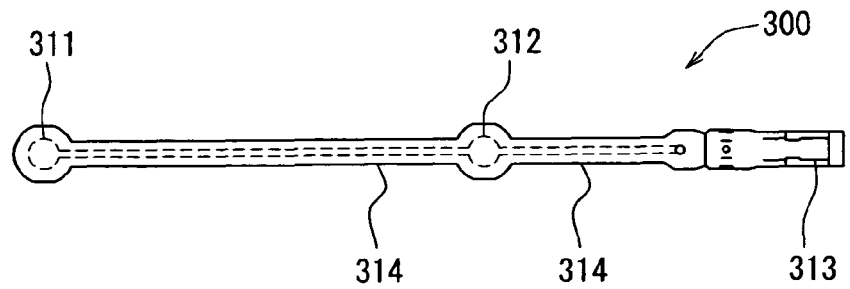
FIG. 9 is a diagram illustrating a plan view of a seating sensor of a fourth embodiment.

Referring to FIG. 9 of the drawings, a seating sensor 300 of a fourth embodiment will be described below. The seating sensor 300 employed in the present embodiment is disposed in a bearing surface part 302a of, in the present example, a left-side vehicle seat 302 with respect to the vehicle center in the right-and-left direction and is located rightward with respect to the center of the bearing surface part 302a. The seating sensor 300 includes one sensor cell or multiple sensor cells 311 and 312 that when incurring a load, conduct with a pair of opposed electrodes abutted on each other.

The seating sensor 300 shown in FIG. 9 includes two sensor cells 311 and 312, a connector 313 disposed at the proximal end of the seating sensor, and a conducting member 314 that links the sensor cells 311 and 312 and the connector 313. The sensor cells 311 and 312 function as switches that conduct when applied a load by an occupant or a piece of luggage. The connector 313 disposed at the proximal end of the seating sensor has two terminals connected to the sensor cells 311 and 312 over the conducting member 314, and is connected to a control unit mounted in a vehicle, for example, an occupant sensing electronic control unit (ECU). The conducting member 314 is formed to linearly extend from the connector 313 disposed at the proximal end. The sensor cells 311 and 312 that conduct over the linear conducting member 314 are disposed at the distal end of the linear conducting member 314 and at the center of the linear conducting member 314 respectively.

FIG. 2 shows the sectional construction that can be used for the seating sensor 300. It should be noted that the center part of the spacer 25 in the width direction thereof is formed to penetrate through the seating sensor as indicated with a dashed line in FIG. 9. As noted above, the first spacer 21 is made of a polyethylene naphthalate (PEN) plastic resin and shaped thinly, contours the sensor cells 311 and 312 and conducting member 314, and is, as a whole, formed linearly. The spacer 25 is made of the PEN plastic resin and shaped thinly, and has the same outline as the first film 21 and second film 22. However, the center part of the spacer 25 in the width direction thereof is formed to penetrate through the seating sensor as indicated with a dashed line in FIG. 9. The penetrative width in the regions of the sensor cells 311 and 312 is larger than the penetrative width in the region of the conducting member 314.

The first film 21 in the regions of the distal end and center of the seating sensor, that is, the regions of the sensor cells 311 and 312 have a substantially circular shape. The first film 21 in the region of the conducting member 314 is shaped to have a width smaller than the diameter of the substantially circular shape of the sensor cells 311 and 312. The connector 313 is coupled to the proximal end of the first film 21. The second film 22 is made of the same material, has the same shape, and is opposed to the first film 21. The proximal end of the second film 22 is coupled to the connector 313.

The first electrode 23 in the regions of the sensor cells 311 and 312 is formed at least in the center of the first film 21 having the substantially circular shape. The first electrode 23 in the region of the conducting member 314 is appropriately wired and connected according to the circuitry for load sensing.

The second electrode 24 in the regions of the sensor cells 311 and 312 is formed in at least the center of the second film 22 having the substantially circular shape.

In the regions of the sensor cells 311 and 312 respectively, the seating sensor 300 is structured to have the first electrode 23 and second electrode 24 opposed to and separated from each other. The second electrode 24 in the region of the conducting member 314 is wired and connected according to the circuitry for load sensing. The first electrode 23 and second electrode 24 in the region of the conducting member 314 conduct to the first electrode 23 and second electrode 24 in the regions of the sensor cells 311 and 312 and to the terminals of the connector 313 coupled to the proximal ends thereof.

The spacer 25 is, as shown in FIG. 2, interposed between the first and second electrodes 23 and 24 such that the first electrode 23, second electrode 24, and spacer 25 form a space. The penetrative width of the spacer 25 in the regions of the sensor cells 311 and 312 respectively is larger than the penetrative width thereof in the region of the conducting member 314. The width of the space in the sensor cells 311 and 312, that is, the width in the right-and-left direction in FIG. 2 is larger than the width of the space in the conducting member 14. Consequently, in the sensor cells 311 and 312 where the space is wide, when a compressive load is applied working in the up-and-down direction as shown in FIG. 2, the first film 21, second film 22, first electrode 23, and second electrode 24 are distorted and deformed. The first and second electrodes 23 and 24 are abutted on each other, and the electrodes 23 and 24 conduct. Namely, in the regions of the sensor cells 311 and 312 respectively, when the compressive load is applied, the first and second electrodes 23 and 24 conduct, that is, function as a so-called switch. The space in the conducting member 314 functions as an air fleeing passage. Namely, the space in the conducting member 314 is intended to allow internal air to flee away when the space in the sensor cells 311 and 312 is compressed.

Figure 10:
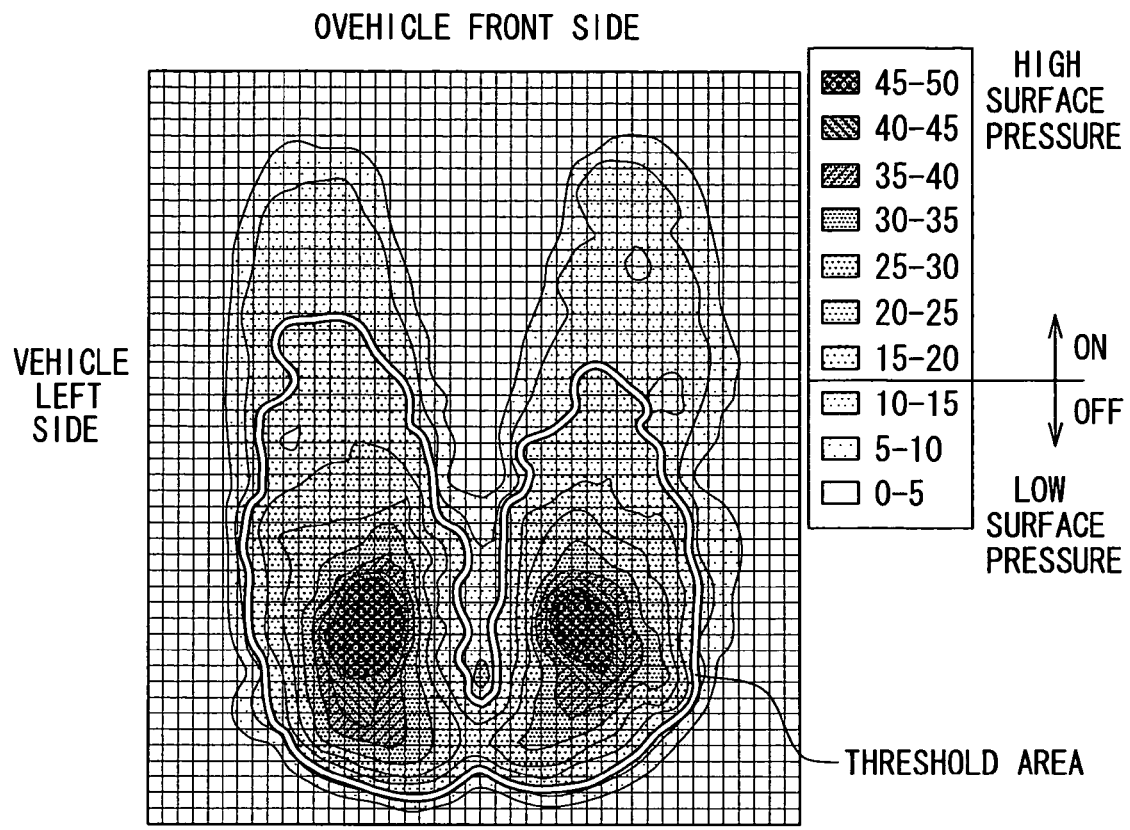
FIG. 10 is a diagram illustrating a sectional view of a region of a sensor cell included in the seating sensor.

FIG. 10 is a chart of a load pressure distribution formed by an occupant seated on the bearing surface part 2a of the vehicle seat 2. The load pressure distribution chart is plotted based on load pressure values measured by arranging numerous load sensors in the form of a matrix all over the bearing surface part 2a, and expresses the load pressure values measured in respective bearing surface areas that are microscopic areas into which the bearing surface part 2a is divided in a mesh-like manner. As shown in the drawing, two load pressure peaks from the load applied by the buttocks of the occupant are observed in the right-and-left direction of the vehicle on the vehicle rear side of the bearing surface part. Load pressure areas extend from the load pressure peaks toward the vehicle front side of the bearing surface part. The distribution chart reflects the shapes of the right and left thighs. In the chart, a threshold area enclosed with a blank curve is associated with an area in which the seating sensor 300 reliably senses the occupant, and is occupied by surface pressures or load pressure values equal to or larger than a predetermined threshold. The threshold area is a load pressure area that reflects the shapes of the buttocks of a human body and the right and left thighs thereof, and is formed substantially symmetrically in the right-and-left direction of the vehicle with respect to a predetermined center that is a seating center so that it will have a concave shape.

Figure 11:
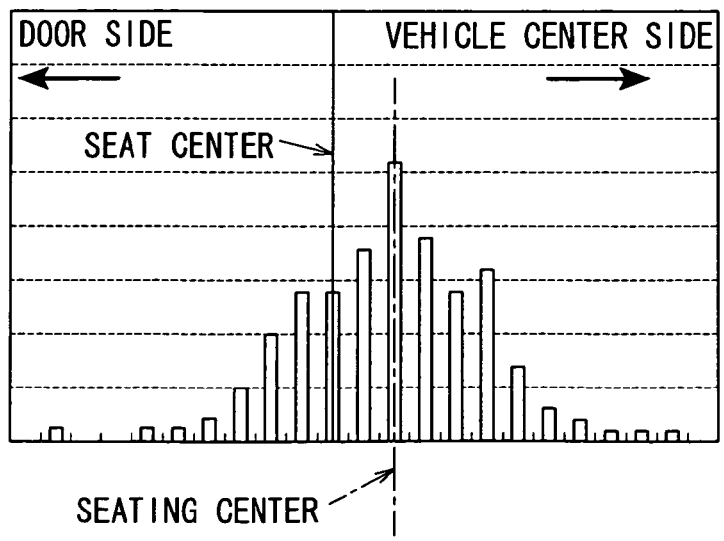
FIG. 11 is a diagram illustrating an exemplary load pressure distribution formed by a seated occupant.

FIG. 11 is a histogram based on the load pressure distribution formed by an occupant who is seated on the bearing surface part 2a of the vehicle seat 2. The histogram is plotted based on the load pressure distribution actually measured by arranging numerous load sensors in the form of a matrix all over the bearing surface part 2a. The histogram expresses the distribution in the vehicle width direction of load pressure values that occupy the center position of the concave load pressure area, which is formed substantially symmetrically in the right-and-left direction of the vehicle, associated with the seating center. As shown in the drawing, the peak of the histogram is associated with the seating center, but is not squared with the seat center or the bearing surface part center and is observed on the vehicle center side of the bearing surface part.

In order to reliably sense seating of an occupant, a seating sensor may include one sensor cell or multiple sensor cells that, when incurring a load, conduct with a pair of opposed electrodes abutted against on each other should be disposed in the area associated with the load pressure area formed with seating of an occupant. The seating sensor is disposed so that the center of a load sensing area formed by the sensor cell or the whole of multiple sensor cells will be located on the vehicle center side of the bearing surface part apart from the structural bearing surface part center of the bearing surface part of the vehicle seat.

Next, a state in which the seating sensor 1 of the present embodiment including one sensor cell or multiple sensor cells is disposed in the bearing surface part 302a of the vehicle seat 302 will be described with reference to FIG. 12.

Figure 12:
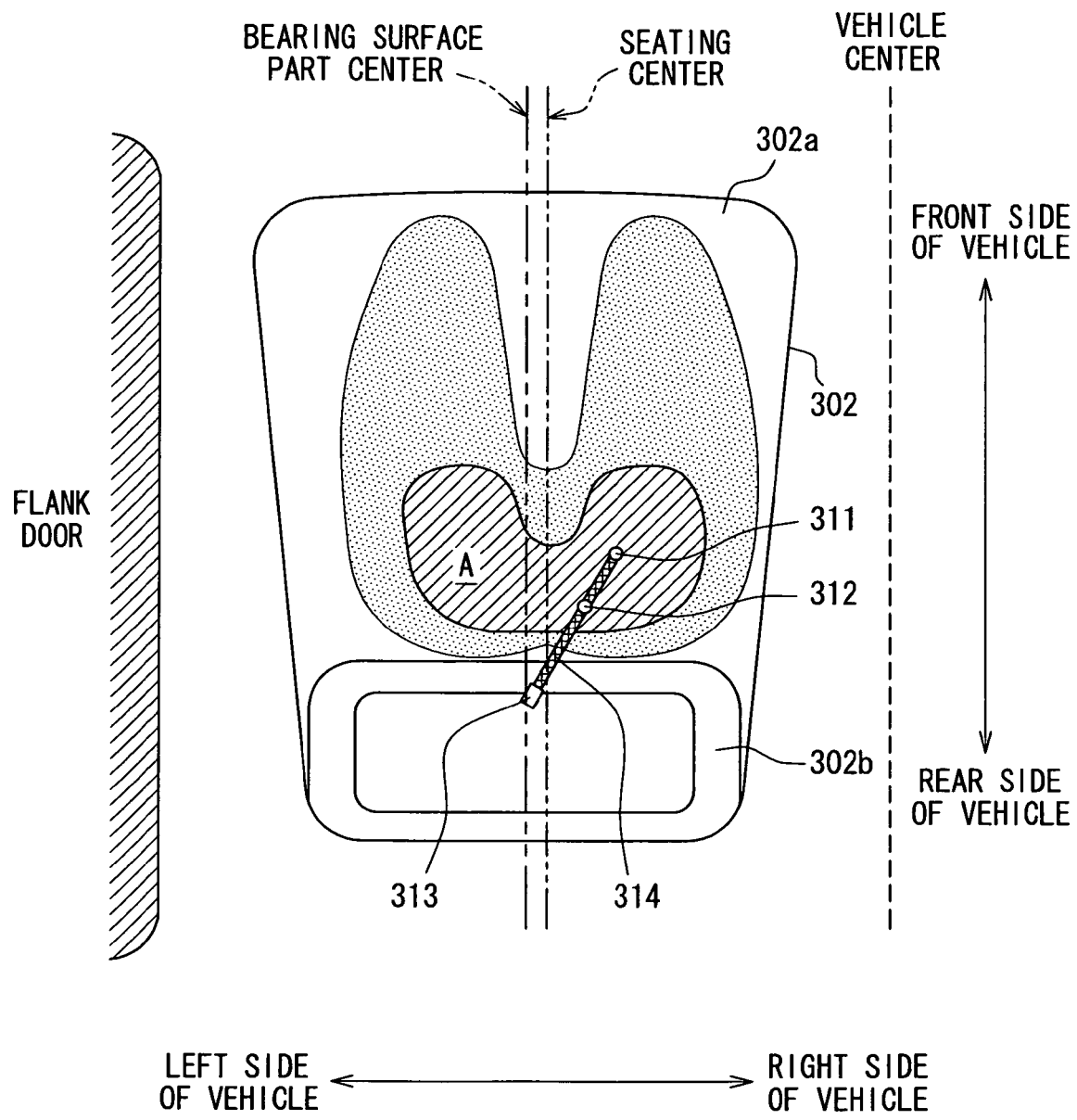
FIG. 12 is a histogram illustrating an exemplary load pressure distribution formed by a seated occupant.

FIG. 12 is a plan view of a state in which the seating sensor 300 of a fourth embodiment is disposed in the bearing surface part 302a of the vehicle seat 302, that is, a view of the seating sensor 300 seen from above the vehicle. Herein, the hatched part of the drawing indicates a range on the bearing surface part 302a to which a load is applied when an occupant sits down on the vehicle seat 302. A substantially concave area hatched with parallel oblique lines, that is, a load pressure area denoted with A in FIG. 12 simulates the area enclosed with the blank curve as shown in FIG. 10, that is, the threshold area. The substantially concave area extends substantially symmetrically in the right-and-left direction of the vehicle reflecting the shape of the buttocks and the right and left thighs and to which a surface pressure or a load pressure equal to or larger than a predetermined threshold is applied. The substantially concave area is the area in which the seating sensor 300 can reliably sense seating of an occupant. The seating sensor 300 will now be described on the assumption that the vehicle seat 302 is located on the left side of the vehicle in the vehicle advancing direction with respect to the vehicle center.

As shown in FIG. 12, the seating sensor 300 is disposed in the bearing surface part 302a of the vehicle seat 302 and interposed between a cushion and a facing which are not shown and are practically included in the bearing surface part 302a. Herein, the load pressure area A, which is formed by the buttocks of an occupant and the right and left thighs thereof, is located slightly toward the vehicle center side of the bearing surface part in a direction away from the bearing surface part center, which is the structural center of the bearing surface part 302a. In other words, the seating center, which forms the center of the load pressure area A is located on the vehicle center side of the bearing surface part that lies relatively in the rightward direction of the vehicle away from the physical center of the bearing surface part 302a, also referred to as the bearing surface part center. The backrest part 302b is disposed on the vehicle rear side of the vehicle seat 302, and bears the load from the upper part of the body of the occupant during vehicle driving or the like, for example, the load resulting from an acceleration G force oriented from the front side of the vehicle to the rear side thereof.

The seating sensor 300 disposed in the bearing surface part 302a of the vehicle seat 302 is arranged so that the connector 313 formed at the proximal end of the seating sensor will be located on an extension from the bearing surface part center on the vehicle rear side of the bearing surface part 302b. The conducting member 314 extends linearly towards the front side of the vehicle at an angle in a direction crossing both the back-and-forth direction of the vehicle and the right-and-left direction, and is disposed so that the distal end thereof will be angled toward the vehicle center side of the vehicle seat. The sensor cells 311 and 312 that when incurring a load, conduct with the pair of opposed electrodes abutted on each other are located within the load pressure area A formed on the bearing surface part 302a along with seating of an occupant, and are located on the vehicle center side of the bearing surface part in the right-and-left direction of the vehicle away from the structural bearing surface part center of the bearing surface part 302a. Namely, the center of the load sensing area, which is formed by the sensor cells 311 and 312, in the right-and-left direction of the vehicle is located on the vehicle center side away from the bearing surface part center.

Consequently, even when the seating posture of an occupant is such that the seating center is laterally deviated from the bearing surface part center to the vehicle center side, since the sensor cells 311 and 312 are disposed within the load pressure area A formed on the bearing surface part 302a along with seating of the occupant, all of the sensor cells 311 and 312, to which the occupant load is applied, conduct. A seating sensor that reliably senses seating of the occupant is therefore realized. Although sensor cells are not disposed in a complex form to match the shape of the load pressure area A, a minimum necessary number of sensor cells, 2 in the present example, can be disposed in a simple form. The configuration of the whole of the arrangement of the sensor cells thus provides a load sensing area formed within the load pressure area corresponding to the seating of an occupant.

In accordance with the present embodiment, the first and second films 21 and 22 have the same linear shape. Multiple pairs of the first and second films 21 and 22 are cut out from a large film substance using, for example, a dieing operation, with the first and second films 21 and 22 placed closely side by side. As a result, the film substance has almost no unnecessary part that becomes wasted. Namely, due to such manufacture, larger numbers of films 21 and 22 than the conventional number of films can be formed from one film substance thereby increasing a yield percentage for the films, reducing cost and improving manufacturing efficiency.

Fifth Embodiment

Figure 13A:
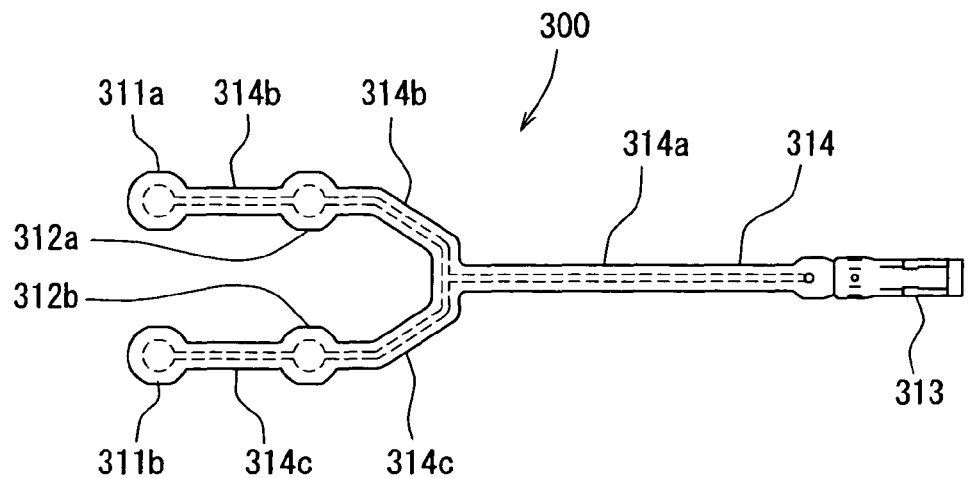
FIG. 13A is a diagram illustrating a plan view of a seating sensor of a fifth embodiment.

Next, a fifth embodiment will be described with reference to FIG. 13A and FIG. 13B. As shown in FIG. 13A, the seating sensor 300 of a fifth embodiment includes four sensor cells 311a, 311b, 312a, and 312b, a connector 313 formed at the proximal end of the seating sensor, and a conducting member 314 that links the sensor cells 311a, 311b, 312a, and 312b and the connector 313 formed at the proximal end. The conducting member 314 is composed of a trunk conducting member 314a formed to linearly extend from the connector 313 at the proximal end, and branch conducting members 314b and 314c formed to bifurcate from the end of the trunk conducting member 314a. The seating sensor 300 of a fifth embodiment is different from that of a fourth embodiment in the above point, and the structure of the sensor cells is the same as that shown in FIG. 2.

Figure 13B:
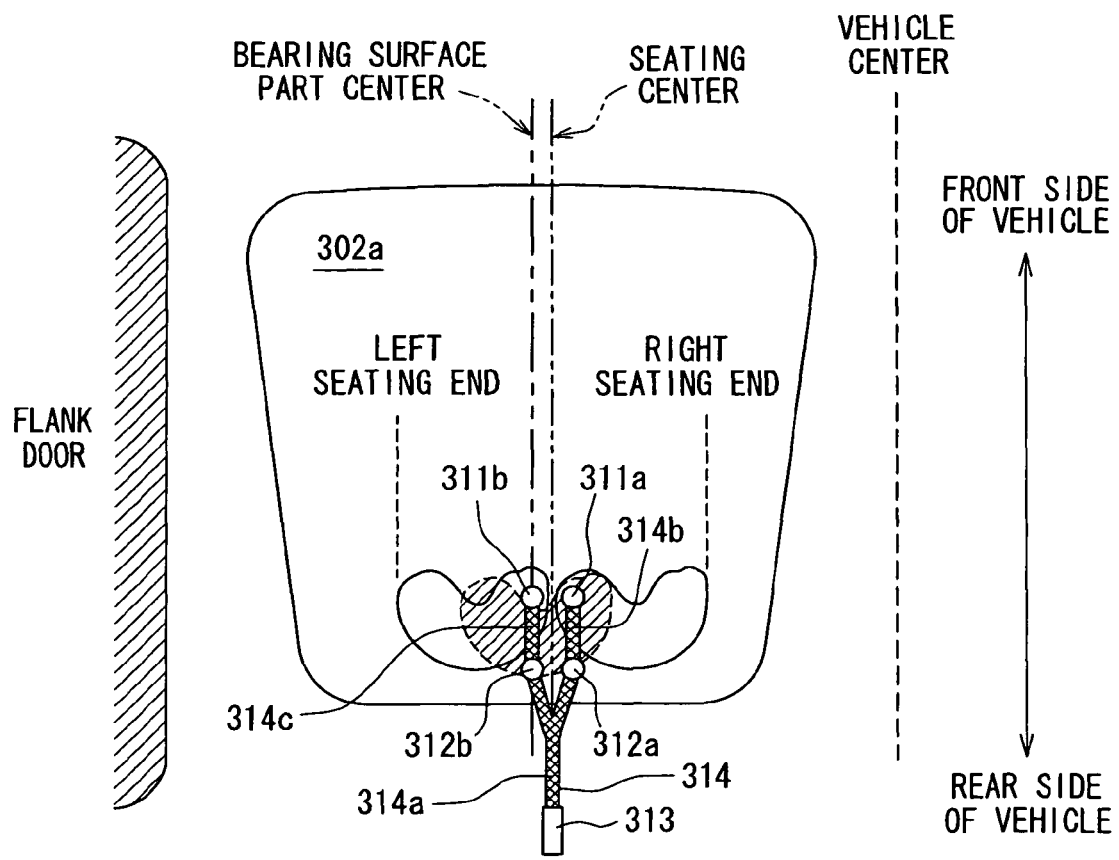
FIG. 13B is a diagram illustrating a plan view of a seating sensor of a fifth embodiment disposed in a bearing surface part of a vehicle seat.

FIG. 13B is a plan view, from which a backrest part 302b is excluded, of the seating sensor 300 of a fifth embodiment disposed in the bearing surface part 302a of the vehicle seat 302. A description will be made of the seating sensor 300 disposed in the bearing surface part 302a of the vehicle seat 302 on the assumption that the vehicle seat 302 is located on the left side of the vehicle in the vehicle advancing direction with respect to the vehicle center. A substantially concave area that is shown hatched with parallel oblique lines and delineated with a dashed line, and substantially concave areas delineated with a solid line refer to a load pressure area formed with seating of an occupant, similar to that shown in FIG. 12. The exemplary load pressure area in the present example is formed based on the occupant being a child of, for example, around six or more years old.

When an object of seating sensing performed by the seating sensor 300 is a child, since the build is smaller than that of an adult, a range of a load pressure area formed on the bearing surface part 302a of the vehicle seat 302 is generally narrow. In addition, since the sizes of the bearing surface part 302a in the right-and-left direction of the vehicle and in the back-and-forth direction thereof are wide compared with the sizes of the buttocks of a child, the child may sit down to lean on the door side of the bearing surface part away from the bearing surface part center thereof, sit down to lean on the vehicle center side of the bearing surface part, or alternate these seating postures. Consequently, even in such a seating state, the seating sensor 300 has to reliably sense seating of an occupant.

The seating sensor 300 shown in FIG. 13B is disposed in the bearing surface part 302a of the vehicle seat 302, or more particularly, disposed between a cushion and a facing (not shown) and are included in the bearing surface part 302a. The seating sensor is disposed so that the connector 313 formed at the proximal end will be located on an extension from a seating part center on the vehicle rear side of the bearing surface part 302b. The trunk conducting member 314a linearly extends toward the front vehicle side of the bearing surface part. The branch conducting member 314b branching out from the end of the trunk conducting member 314a is disposed in parallel with the trunk conducting member 314a on the right side of the seating center and on the vehicle center side of the bearing surface part center. The branch conducting member 314c is disposed in parallel with the trunk conducting member 314a on the left side of the seating center and near the bearing surface part center away from the seating part center. The sensor cells 311a and 312a conduct with the pair of opposed electrodes abutted against each other when incurring a load. The sensor cells 311a and 312a are arranged to lie in an overlapping portion of a load pressure area formed when a seated occupant leans toward the vehicle center side of the bearing surface part, and a load pressure area formed when the occupant sits normally with respect to the bearing surface part center. The sensor cells 311b and 312b are arranged to lie in an overlapping portion of a load pressure area formed when a seated occupant leans toward the flank door side of the bearing surface part, and a load pressure area formed when the occupant sits normally with respect to the bearing surface part center.

In other words, the center of a load sensing area, which is formed by the sensor cells 311a, 311b, 312a, and 312b, in the right-and-left direction of the vehicle is located on the vehicle center side of the bearing surface part away from the structural bearing surface part center of the bearing surface part 2a in the same manner as that in a fourth embodiment.

Consequently, even when an occupant is a child, since the arrangement of the sensor cells 311a, 311b, 312a, and 312b falls inside a diversity of load pressure areas that are formed with seating of different occupants, all the sensor cells 311a, 311b, 312a, and 312b, having incurred a load, conduct. Thus, a seating sensor that can reliably sense the seating of an occupant is realized.

Further, according to the seating sensor 1 of the present embodiment, since the spacing between the branch conducting members 314b and 314c can be narrowed, a cost of machining to be performed on a film substance out of which the sensor cells died out can be greatly reduced.

Variant of a Third Embodiment

Figure 14:
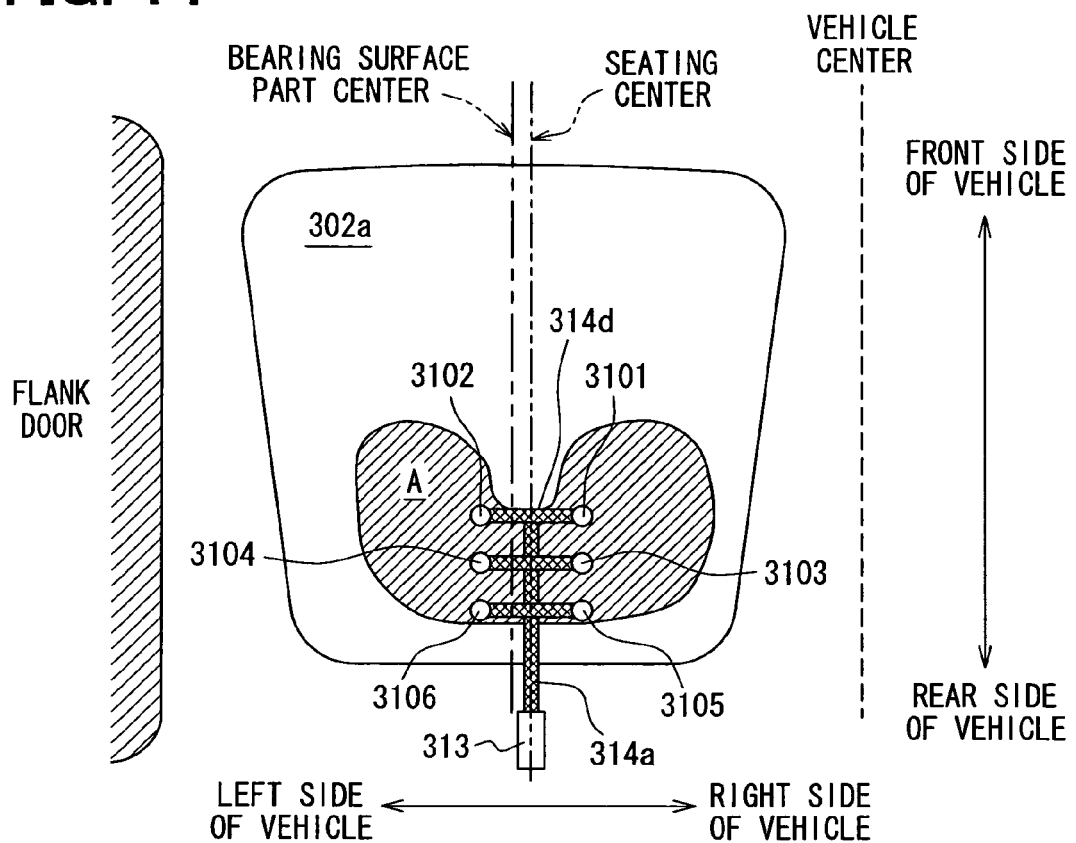
FIG. 14 is a diagram illustrating a plan view of a seating sensor in accordance with a variant of a third embodiment is disposed in the bearing surface of the vehicle seat.

In a manner similar to a third embodiment and a fifth embodiment as described above, where the conducting member 314 of the seating sensor 300 includes the trunk conducting member 314a and branch conducting members 314b and 314c, a variant of the construction of the conducting member 314 is not limited. For example, as shown in FIG. 14, a seating sensor 300 can include six sensor cells 3101 to 3106, a connector 313 formed at the proximal end of the seating sensor, and a conducting member 314 that links the sensor cells 3101 to 3106 and the connector 313 formed at the proximal end. The conducting member 314 may be composed of a trunk conducting member 314a formed to linearly extend from the connector 313 at the proximal end, and multiple right-and-left conducting members 314d formed to extend from the trunk conducting member 314a in the right-and-left direction of the vehicle.

By including the right-and-left conducting members 314d that extend in the right-and-left direction, a load pressure area formed substantially symmetrically in the right-and-left direction of the vehicle with respect to the seating center can be established. More particularly, a peak burden imposed by the buttocks can be sensed by the sensor cells 3101 and 3102 disposed on both the right and left sides of the trunk conducting member 314a. Further, since multiple right-and-left conducting members 314d, three in the present example, are configured to intersect the trunk conducting member 314a, which linearly extends in the back-and-forth direction of the vehicle, a load sensing area of the seating sensor 300 can be expanded not only in the right-and-left direction of the vehicle but also in the back-and-forth direction.

Sixth Embodiment

Next, as a sixth embodiment, a seating sensor that can reliably sense seating of an occupant or occupants when disposed in a bearing surface part of a vehicle seat for seating of multiple occupants, will be described with reference to FIG. 15. In the present embodiment, the vehicle seat for seating of multiple occupants refers to a vehicle seat formed as a united body having, for example, three seating positions.

Figure 15:
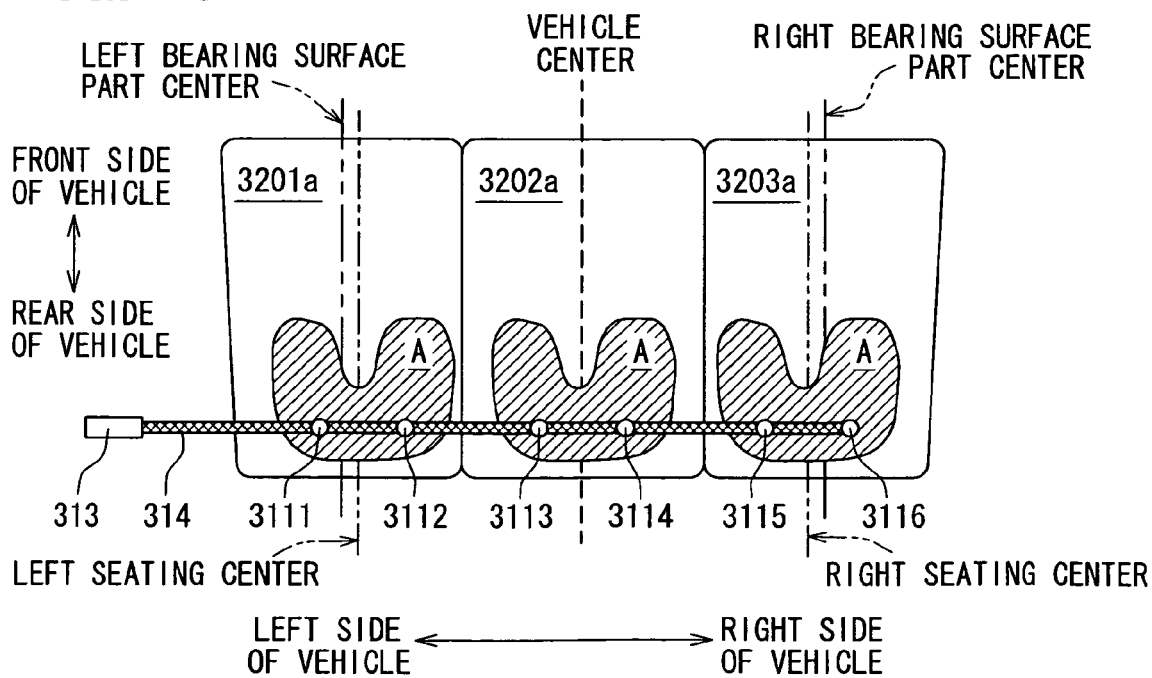
FIG. 15 is a diagram illustrating a plan of a seating sensor of a sixth embodiment disposed in multiple bearing surface parts of a vehicle seat for seating multiple occupants.

FIG. 15 is a plan view of the seating sensor 300 of the present embodiment in which a backrest part (not shown). The seating sensor 300 is disposed in bearing surface parts 3201*a*, 3202*a*, and 3203*a* of a vehicle seat for seating multiple occupants. As shown, the seating sensor 300 of a sixth embodiment includes six sensor cells 3111 to 3116, a connector 313 formed at the proximal end of the seating sensor, and a conducting member 314 that links the sensor cells 3111 to 3116 and the connector 313 at the proximal end. The seating sensor 300 is the same as the seating sensor 300 of a fourth embodiment except that the number of sensor cells is six. The whole of the seating sensor 3101 is linearly shaped. Specifically, the sensor cells 3111 to 3116 are arranged on the conducting member 314, which extends linearly in the right-and-left direction of the vehicle, the connector 313 being coupled to the proximal end thereof. Since the structure of the sensor cells is the same as that of the seating sensor 300 of a fourth embodiment, a description will be omitted.

As shown in FIG. 15, a substantially concave area that is hatched with parallel oblique lines and located on the vehicle rear side of each of the bearing surface parts 3201*a*, 3202*a*, and 3203*a*, is a load pressure area denoted by A and corresponds to a threshold area, which is an area such as, for example, the area enclosed with a blank curve in FIG. 10. The seating sensor 300 is disposed so as to extend through the bearing surface parts 3201*a*, 3202*a*, and 3203*a* of the vehicle seat for seating of multiple occupants, and can be interposed between a cushion and a facing (not shown) included in the construction of bearing surface parts 3201*a*, 3202*a*, and 3203*a*.

Even in the case of a vehicle seat for seating of multiple occupants, respective load pressure areas A can be formed based on seating of an occupant or occupants and have seating centers in various positions as will be described. Specifically, the load pressure area A formed on the bearing surface part 3201*a*, which is positioned on the left side of the vehicle from the vehicle center, has a seating center located rightward toward the vehicle center with respect to the bearing surface part center. The load pressure area A formed in the bearing surface part 3203*a*, which is positioned on the right side of the vehicle from the vehicle center, has a seating center located leftward with respect to the bearing surface part center. The load pressure area A formed in the center bearing surface part 3202*a* has a bearing surface part center that is substantially aligned with the vehicle center and further has a seating center substantially aligned with the bearing surface part center.

Since the sensor cells 3111 and 3112, 3113 and 3114, and 3115 and 3116 are arranged respectively in the load pressure areas A formed in the corresponding bearing surface parts 3201*a*, 3202*a*, and 3203*a* along with seating of occupants, any of the sensor cells 3111 to 3116 that have incurred a load will conduct. Thus, even in a vehicle seat for seating multiple occupants, a simple seating sensor capable of reliably sensing seating of an occupant or occupants can be realized. Specifically, as shown in FIG. 15, an exemplary seating sensor is disposed so that the center of a load sensing area formed, for example, by the sensor cells 3111 and 3112 in the bearing surface part 3201*a*, will be located on the vehicle center side of the bearing surface part away from the bearing surface part center in the right-and-left direction of the vehicle. The center of a load sensing area formed, for example, by the sensor cells 3115 and 3116 in the bearing surface part 3203*a*, will be located on the vehicle center side of the bearing surface part away from the bearing surface part center thereof in the right-and-left direction of the vehicle. The center of a load sensing area formed by the sensor cells 3113 and 3114 in the bearing surface part 3202*a*, will be aligned more or less with the vehicle center and the bearing surface part center.

Additional Variants

In accordance with one or more variants of the above described embodiments, one or more sensor cells of multiple sensor cells included in the seating sensor 300 may be disposed in an area on the vehicle center side of a bearing surface part away from the structural bearing surface part center. When such a construction is adopted, a load sensing area having an increased effective size, one that is compatible with various seating postures of occupants, can be formed, thus increasing a sensing range without correspondingly increasing the number and placement of sensor cells.

It should be noted that the number of sensor cells included in an exemplary seating sensor that forms a load sensing area is advantageously equal to or smaller than ten. Accordingly, cost reduction and increased sensing capability can be achieved.

What is claimed is:

1. A seating sensor disposed in a bearing surface part of a vehicle seat, the seating sensor, comprising:
a first sensor cell;
a second sensor cell connected in series with the first sensor cell and disposed beyond the first sensor cell in the bearing surface part toward a front side of the vehicle; and
a third sensor cell connected in series with the first sensor cell, the third sensor cell connected in parallel with the second sensor cell, the third sensor cell disposed beyond the first sensor cell in the bearing surface part toward a rear side of the vehicle, wherein:
each of the first sensor cell, the second sensor cell and the third sensor cell including two opposed electrodes abutted against each other, the two opposed electrodes conducting when incurring a load; and
the first sensor cell, the second sensor cell and the third sensor cell are only in linear alignment.

2. The seating sensor according to claim 1, wherein the second and third sensor cells are displaced from the first sensor cell to respective ones of the right and left sides of the vehicle so that all the first, second and third sensor cells are arranged on a straight line inclined from a center line between the right side and the left side of the bearing surface.

3. The seating sensor according to claim 2, wherein the second sensor cell is displaced from the first sensor cell to one of the right and left sides of the vehicle, and the third sensor cell is displaced from the first sensor cell to the other one of the right and left sides of the vehicle only in a rear side of the bearing surface part relative to a center of the bearing surface part.

4. The seating sensor according to claim 1, wherein the second and third sensor cells are displaced from the first sensor cell to one of the right side and the left side of the vehicle only in a rear side of the bearing surface part relative to a center of the bearing surface part.

5. A seating sensor disposed in a bearing surface part of a vehicle seat, the bearing surface part having a bearing surface part center disposed at a centerline of the bearing surface part, the vehicle seat located in one of a rightward direction and a leftward direction with respect to a vehicle center, the seating sensor comprising:
a plurality of linearly aligned sensor cells, each of the plurality of linearly aligned sensor cells having a pair of opposed electrodes abutted against each other the pair conducting when incurring a load; and
a load sensing area established by the plurality of linearly aligned sensor cells in the bearing surface part, wherein:
a center of the load sensing area is spaced apart from the bearing surface part center toward a vehicle center.

6. The seating sensor according to claim 5, further comprising:
a first film; and a second film formed to have the same shape as the first film, the second film opposed to the first film, wherein:

the plurality of sensor cells are opposed to and separated from one another between the first and second films in a horizontal direction; and the seating sensor further comprises a conducting member interposed between the first and second films, the conducting member coupled to the plurality of sensor cells and a control unit, the conducting member conducting between the sensor cells and the control unit.

7. The seating sensor according to claim 6, wherein the conducting member extends linearly in the bearing surface part in a direction crossing both the back-and-forth direction of the vehicle and the right-and-left direction thereof.

8. The seating sensor according to claim 6, wherein the conducting member includes a trunk conducting member having a proximal end, the trunk conducting member conducting to the control unit and extending in the back-and-forth direction of the vehicle, the conducting member further including right-and-left conducting members coupled to the trunk conducting member and extending in the right-and-left direction of the vehicle.

9. The seating sensor according to claim 6, wherein the conducting member includes a trunk conducting member having a proximal end and a distal end, the trunk conducting member conducting to the control unit and extending in the back-and-forth direction of the vehicle, the conducting member further including a plurality of branch conducting members branching out from the distal end and extending in the back-and-forth direction of the vehicle.

10. The seating sensor according to claim 5, wherein a number of the plurality of sensor cells is equal to or smaller than ten.

11. The seating sensor according to claim 5, wherein the plurality of sensor cells is disposed in an area on the rear side of the bearing surface part away from the center of the bearing surface part in a back-and-forth direction of the vehicle.

12. The seating sensor according to claim 5, wherein the vehicle seat includes a plurality of bearing surface parts corresponding to a plurality of side by side occupant seating positions, the plurality of linearly aligned sensor cells aligned linearly in the right-and-left direction of the vehicle such that a respective at least two of the plurality of linearly aligned sensor cells establish a load sensing area in each of the plurality of bearing surface parts, wherein a center of the load sensing area is offset from a corresponding center of the each of the plurality of bearing surface parts in at least one of the plurality of bearing surface parts.

13. The seating sensor according to claim 1, further comprising:

a conducting member extending in a straight line in both a right-and-left direction and a back-and-forth direction of the bearing seat and connecting the first, second and third sensor cells; and a connector connected at one end of the conducting member, wherein the conducting member is provided only in the rear side of the bearing surface relative to the center of the bearing surface.

14. The seating sensor according to claim 1, wherein the second sensor cell is only connected in series with the first sensor cell and only connected in parallel with the third sensor cell.

15. The seating sensor according to claim 14, wherein the third sensor cell is only connected in series with the first sensor cell and only connected in parallel with the second sensor cell.

* * * * *

UNITED STATES PATENT AND TRADEMARK OFFICE
CERTIFICATE OF CORRECTION

| | | |
|---|---|---|
| PATENT NO. | : 7,918,144 B2 | Page 1 of 1 |
| APPLICATION NO. | : 12/290446 | |
| DATED | : April 5, 2011 | |
| INVENTOR(S) | : Yukihiro Saitoh et al. | |

It is certified that error appears in the above-identified patent and that said Letters Patent is hereby corrected as shown below:

In the Title Page:

Item (73), Assignee: "Denso Corporation, Kariya (JP)" -- should be Denso Corporation, Kariya-city (JP); Toyota Jidosha Kabushiki Kaisha, Toyota-city (JP) --

Signed and Sealed this

Twentieth Day of December, 2011

David J. Kappos
*Director of the United States Patent and Trademark Office*